United States Patent [19]

Isoe

[11] Patent Number: 4,995,096
[45] Date of Patent: Feb. 19, 1991

[54] DEMAND-ASSIGNMENT MULTIPLE ACCESS CONTROL SYSTEM

[75] Inventor: Yasuhito Isoe, Tokyo, Japan

[73] Assignee: NEC Corporation, Japan

[21] Appl. No.: 352,686

[22] Filed: May 10, 1989

Related U.S. Application Data

[63] Continuation-in-part of Ser. No. 292,385, Dec. 30, 1988, abandoned.

[30] Foreign Application Priority Data

Jan. 11, 1988 [JP] Japan .................................. 63-4135

[51] Int. Cl.$^5$ ........................................... H04B 7/185
[52] U.S. Cl. ........................................ 455/12; 455/20
[58] Field of Search ...................... 455/9, 12, 15-17, 455/34, 20; 340/825.06; 370/104.1, 85.3, 93

[56] References Cited

U.S. PATENT DOCUMENTS

| 4,451,916 | 5/1984 | Casper et al. | 455/9 |
| 4,491,968 | 1/1985 | Shimp et al. | 455/9 |
| 4,763,129 | 8/1988 | Perrotta | 455/12 |

Primary Examiner—Reinhard J. Eisenzopf
Assistant Examiner—Curtis Kuntz
Attorney, Agent, or Firm—Laff, Whitesel, Conte & Saret

[57] ABSTRACT

A DAMA control system for an SCPC satellite communication system includes first and second control stations which can independently perform centralized DAMA control through corresponding common signaling channels, a large number of slave stations capable of receiving data through either common signaling channel, and a satellite station. While one control station performs DAMA control, the other control station performs a backup operation. When one control station loses a control function, the other control station takes over centralized DAMA control.

1 Claim, 1 Drawing Sheet

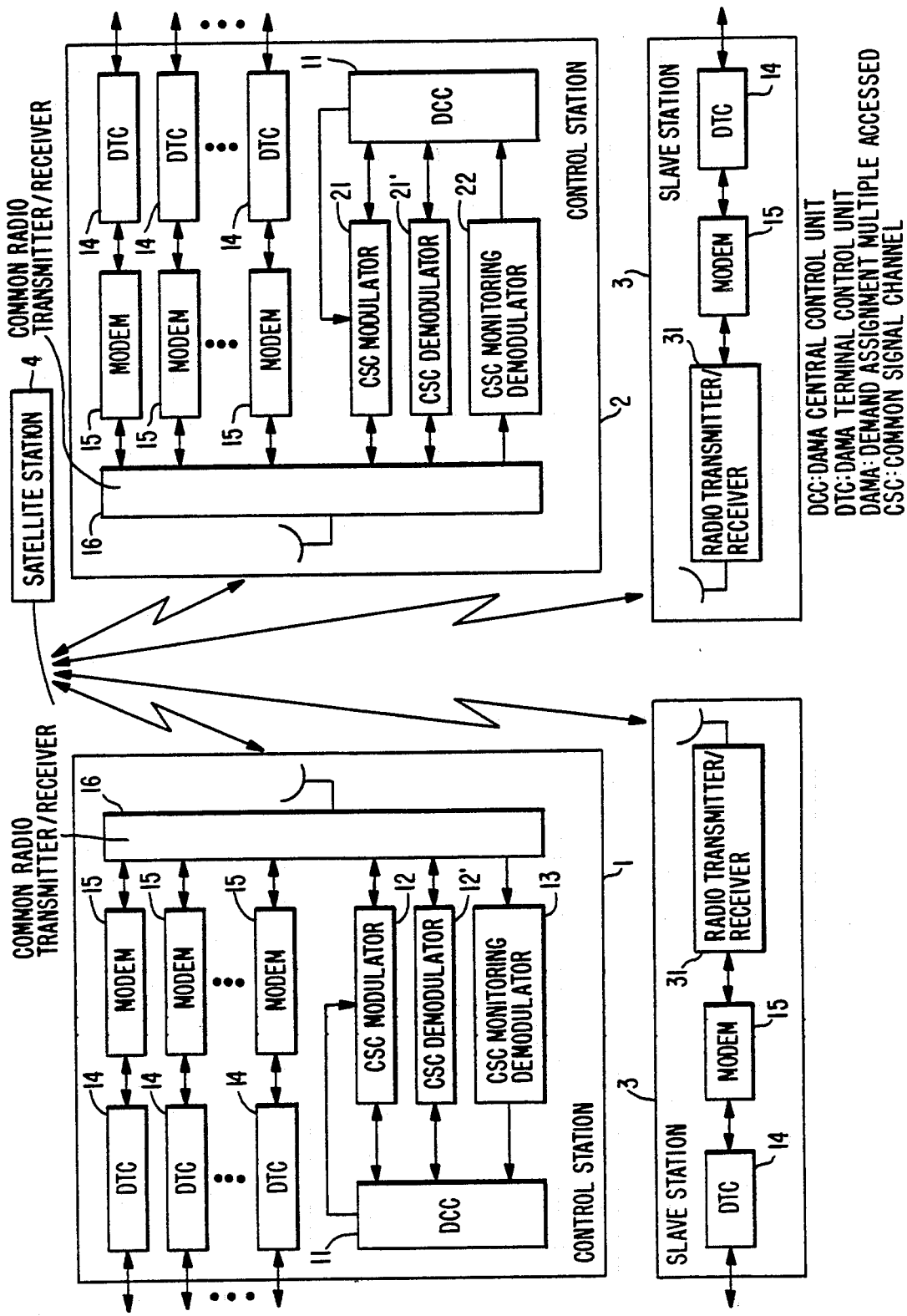

DEMAND-ASSIGNMENT MULTIPLE ACCESS CONTROL SYSTEM

This application is a continuation-in-part of application Ser. No. 07/292,385 filed Dec. 30, 1988, now abandoned.

BACKGROUND OF THE INVENTION

The present invention relates to a demand-assignment multiple access (to be referred to as DAMA hereinafter) control system and, more particularly, to a centralized DAMA control system in an SCPC (Single Channel Per Carrier) satellite communication system.

An SCPC system for employing one carrier for each channel has been very popular in satellite communication networks.

In recent years, DAMA for assigning a plurality of communication channels by channel requests has been employed since it is very effective to efficiently utilize satellite power and reduce the number of MODEMs required in terminal equipment. A small satellite communication system often employs centralized DAMA control.

In a satellite communication system using a conventional centralized DAMA control system, a DAMA central control unit installed in one control station performs DAMA control of slave stations as well as itself through a common signaling channel using an exclusive carrier for DAMA control. However, since only one control station is available, loss of its centralized DAMA control capacity results in communication function failure of the entire satellite communication system.

SUMMARY OF THE INVENTION

It is an object of the present invention to provide a DAMA control system wherein the entire satellite communication system does not lose its communication function even if one control station loses a centralized DAMA control capacity.

In order to achieve the above object of the present invention, there is provided a DAMA control system comprising: a first central station including a first DAMA central control unit for performing centralized DAMA control for assigning a plurality of communication channels using different carriers by channel requests, receiving a channel request through a first common signaling channel using a carrier different from those of the communication channels, sending out a channel assignment result for the received channel request, and sending out predetermined pattern data through the first common signaling channel upon occurrence of an abnormal state; a second control station including a second DAMA central control unit tuned to the first common signaling channel in a normal state to receive the predetermined pattern data, the second DAMA central control unit, upon non-reception of the carrier of the first common signaling channel, being operated to perform centralized DAMA control in place of the first DAMA central control unit and being tuned to a second common signaling channel using a carrier different from those of the communication channels and the first common signaling channel to receive the channel request and send out a communication channel assignment result for the received channel request; and a plurality of slave stations each including at least one transmitter/receiver tunable to any of the first and second common signaling channels and the communication channels, and a DAMA terminal control unit for controlling tuning of the transmitter/receiver such that the transmitter/receiver is tuned to the first common signaling channel to receive the predetermined pattern data through the transmitter/receiver in a normal state, and that, upon non-reception of the carrier of the first common signaling channel, the transmitter/receiver is tuned to the second common signaling channel to send out the channel request for its own station through the transmitter/receiver tuned to the first or second common signaling channel and to receive the communication channel assignment result of its own station, thereby controlling tuning of the transmitter/receiver to allow communication on the basis of the received communication channel assignment result.

BRIEF DESCRIPTION OF THE DRAWING

The drawing is a block diagram showing a configuration of a DAMA control system according to the present invention.

DETAILED DESCRIPTION OF THE PREFERRED EMBODIMENT

The present invention will be described in detail with reference to the accompanying drawing.

A DAMA control system comprises control stations 1 and 2, a large number of slave stations 3 (only two slave stations are illustrated), and a satellite station 4. Bidirectional common signaling channels A and B (to be referred to as CSC-A and CSC-B hereinafter) and a large number of communication channels which are relayed by the satellite station 4 using different carriers are used.

The control station 1 comprises a DAMA central control (to be referred to as DCC hereinafter) unit 11, a CSC modulator 12 connected to the DCC unit 11, a CSC demodulator 12' connected to the DCC unit 11, a CSC monitoring demodulator 13 connected to the DCC unit 11, a plurality of DAMA terminal control (to be referred to as DTC) units 14, MODEMs 15 connected to the DTC units 14 in a one-to-one correspondence, and a common radio transmitter/receiver 16 connected to the CSC modulator 12, the CSC demodulator 12', the CSC monitoring demodulator 13, and the MODEs 15. The control station 2 has substantially the same arrangement as the control station 1 except that the CSC modulator 12, the CSC demodulator 12', and the CSC monitoring demodulator 13 are respectively replaced with a CSC modulator 21, a CSC demodulator 21', and a CSC monitoring demodulator 22.

The CSC modulator 12 performs processing (e.g., framing and error correction coding) for transmitting data from the DCC unit 11 to each DTC unit 14 through a corresponding bidirectional signal line. When the DCC unit 11 sends an alarm signal representing an abnormal state to the CSC modulator 12, the modulator 12 forcibly fixes data for the DTC unit 14 to a specific pattern (e.g., all "1"s).

The control station 1 or 2 is arranged to be a supplementary station for the control station currently operated. While one control station, e.g., the control station 1 is operated, the other control station, e.g., the control station 2 serves as a supplementary station. The DCC unit 11 of the control station 1 which is currently operated performs centralized DAMA control, while the DCC unit 11 of the control station 2 performs a backup operation of the centralized DAMA control.

The CSC modulators 12 and 21 send modulated continuous mode signals of data output from the corresponding DCC units 11 in one direction of the CSC-A and CSC-B through the corresponding common radio transmitters/receivers 16. The CSC demodulators 12' and 21' demodulate burst mode signals received from the other direction of the CSC-A and CSC-B through the corresponding common radio transmitter/receivers 16 and send the modulated data to the corresponding DCC units 11. Of the CSC modulators 12 and 21 and the CSC demodulators 12' and 21', the pair of modulator and demodulator which are connected to the backup DCC unit 11 are kept disabled.

The CSC monitoring demodulators 13 and 22 demodulate continuous mode signals received through the CSC-B and CSC-A by the corresponding common radio transmitters/receivers 16 and send the demodulated data to the corresponding DCC units 11.

Each MODEM 15 can exchange data through any one of the CSC-A, CSC-B, and each communication channel through the corresponding common radio transmitter/receiver 16. In data communication with the CSC-A and CSC-B, the demodulating side of the MODEM 15 receives and demodulates the data for the continuous mode, and the demodulated data is output to the corresponding DTC unit 14, while the modulating side of the MODEM 15 outputs a burst mode signal modulated by the data input from the corresponding DTC unit 14. A channel to which each MODEM 15 is tuned is determined by the corresponding DTC unit 14.

Each slave station 3 comprises a DTC unit 14, a MODEM 15, and a radio transmitter/receiver 31 which are connected in the order named from the input side. The radio transmitter/receiver 31 performs the same operations as in the common radio transmitters/receivers 16 operated together with the MODEMs 15 in the control stations 1 and 2.

Assume that in an initial state, the control station 1 is operated and the control station 2 is set to be a supplementary station. An operation of the DAMA control system shown in the drawing will now be described.

In the initial state, the DCC unit 11 in the control station 1 causes to operate the CSC modulator 12 and the CSC demodulator 12'. The DCC unit 11 in the control station 2 causes to disable the CSC modulator 21 and the CSC demodulator 21'. The DTC units 14 in the control stations 1 and 2 and each slave station 3 tune the MODEMs 15 connected thereto to the CSC-A. As a result, a continuous mode carrier is output from the control station 1 via the CSC-A. The DCC unit 11 in the control station 2 detects the continuous mode carrier on the CSC-A through the CSC monitoring demodulator 22. The DTC units 14 in the control stations 1 and 2 and each slave station 3 detects the continuous mode carrier on the CSC-A through the corresponding MODEMs 15.

When a channel request is input to one of the DTC units 14 via an external line, this DTC unit 14 outputs channel request data including identification data representing a channel request source and a destination. The channel request data is transferred as a burst mode signal to the DCC unit 11 in the control station 1 via the CSC-A. The DCC unit 11 in the control station 1 stores a state of use of each communication channel and assigns an available communication channel to the input channel request data. The DCC unit 11 outputs assignment data including identification data representing an assigned communication channel, the channel request source, and the destination, and, then, updates a memory content representing the state of use of each communication channel. The assignment data is transferred as a continuous mode signal to each DTC unit 14 via the CSC-A. The DTC units 14 connected to the channel request source and the destination which is designated by the assignment data tune the corresponding MODEMs 15 to the assigned communication channel. The corresponding MODEMs 15 are connected to corresponding external lines, thereby allowing communication. When communication is completed, the MODEMs 15 used during communication is disconnected from the external line under the control of the corresponding DTC unit 14. One of the DTC units 14 signals an end of communication to the DCC unit 11 in the control station 1. Upon reception of this signaling, the DCC unit 11 updates the memory content representing the state of use of each communication channel and outputs assignment release data including identification data of the released communication channel.

Meanwhile, the DCC unit 11 in the control station 2 performs backup operations for storing and updating the data so as to match its memory content representing the state of use of each communication channel with that of the DCC unit 11 of the control station 1 by using the assignment data and assignment release data which are input from the CSC monitoring demodulator 22.

When the DCC unit 11 in the control station 1 detects an abnormality in the centralized DAMA control function of its own, it outputs specific pattern data (e.g., all "1"s). As a result, the DCC unit 11 in the control station 2 receives the specific pattern data from the CSC monitoring demodulator 22 to start the CSC modulator 21, thereby outputting a continuous mode carrier to the CSC-B. In this manner, the DCC unit 11 in the control station 2 performs centralized DAMA control in place of the DCC unit 11 in the control station 1. When the CSC monitoring demodulator 22 does not receive the continuous mode carrier from the CSC-A, the DCC unit 11 in the control station 2 performs the same operations as that performed when the control station 1 is abnormal.

When each DTC unit 14 connected to the corresponding MODEM 15 tuned to the CSC-A but in a non-busy state detects that this MODEM 15 outputs the specific pattern data or the continuous mode carrier from the CSC-A is no longer received, the DTC unit 14 tunes the MODEM 15 to the CSC-B to confirm the presence of the continuous mode carrier on the CSC-B. In this case, the DTC unit 14 connected to the MODEM 15 in the busy state tunes the MODEM 15 to the CSC-A at the end of communication and performs the same operations as that of the non-busy state DTC units 14.

When the abnormal state of the control station 1 is recovered by a maintenance operation after centralized DAMA control is shifted to the DCC unit 11 in the control station 2, the state of use of each communication channel which is stored in the DCC unit 11 in the control station 2 is transferred (manually) to the DCC unit 11 of the control station 1 in a CSC-B continuous mode. Thereafter, the DCC unit 11 in the control station 1 performs the backup operation.

The above description is concerned with the operation of the embodiment shown in the accompanying drawing.

The CSC demodulator 12' (or 21') and the CSC monitoring demodulator 13 (or 22) need not be simultaneously operated. If the CSC demodulator 12' (or 21') is tunable to the CSC-A or CSC-B under the control of the DCC unit 11 and can be operated in either the continuous mode or the burst mode, the separate CSC monitor demodulator 13 (or 22) need not be arranged.

If one of the control stations 1 and 2 serves as a main station currently operated and the other station serves as a supplementary station, the CSC monitoring demodulator 13 or 22 need not be arranged in the control station currently operated. In this case, when the normal state of the main control station is restored while the supplementary control station performs centralized DAMA control, centralized DAMA control is manually shifted from the supplementary control station to the main control station.

According to the present invention, the DAMA control system comprises the main control station which is currently operated and the supplementary control station. In the normal state, the main control station performs centralized DAMA control. When the supplementary control station detects an abnormal state of the main control station through the main common signaling channel, the supplementary control station performs centralized DAMA control through the supplementary common signaling channel. The slave station detects the presence or absence of an abnormal state of the main control station and is controlled by DAMA control through the main or supplementary common signaling channel on the basis of the above detection result. Even if one control station loses its centralized DAMA control function, the communication function of the entire satellite communication system is not lost. When the main control station which is in operation is in an abnormal state, the carrier in the supplementary common signaling channel is set of "OFF". When the supplementary control station and the slave station which monitor the operating state of the main control station detect this "OFF" state of the carrier in the common signal channel, a switching over from the main control station to the supplementary control station is performed.

What is claimed is:

1. A DAMA (Demand Assignment Multiple Access) control system comprising:

a first central station including a first DAMA central control unit for performing centralized DAMA control for assigning a plurality of communication channels using different carriers by channel requests, receiving a channel request through a first common signaling channel using a carrier different from those of said communication channels, sending out a channel assignment result for the received channel request, and sending out predetermined pattern data through said first common signaling channel upon occurrence of an abnormal state;

a second control station including a second DAMA central control unit tuned to said first common signaling channel in a normal state to receive the predetermined pattern data, said second DAMA central control unit, upon non-reception of the carrier of said first common signaling channel, being operated to perform centralized DAMA control in place of said first DAMA central control unit and being tuned to a second common signaling channel using a carrier different from those of said communication channels and said first common signaling channel to receive the channel request and send out a communication channel assignment result for the received channel request; and a plurality of slave stations each including at least one transmitter/receiver tunable to any of said first and second common signaling channels and said communication channels, and a DAMA terminal control unit for controlling tuning of said transmitter/receiver such that said transmitter/receiver is tuned to said first common signaling channel to receive the predetermined pattern data through said transmitter/receiver in a normal state, and that, upon non-reception of the carrier of said first common signaling channel, said transmitter/receiver is tuned to said second common signaling channel to send out the channel request for its own station through said transmitter/receiver tuned to said first or second common signaling channel and to receive the communication channel assignment result of its own station, thereby controlling tuning of said transmitter/receiver to allow communication on the basis of the received communication channel assignment result.

* * * * *